US012728435B2

(12) United States Patent
Liang et al.

(10) Patent No.: US 12,728,435 B2
(45) Date of Patent: Sep. 8, 2026

(54) ALL-PLASTIC COMBINED PRESS PUMP

(71) Applicant: Majesty Holdings Co., Ltd., Zhongshan (CN)

(72) Inventors: Peihui Liang, Zhongshan (CN); Maoyong Zhu, Zhongshan (CN); Jinkao Liang, Zhongshan (CN); Yonglei Zhang, Zhongshan (CN)

(73) Assignee: Majesty Holdings Co., Ltd., Zhongshan (CN)

( * ) Notice: Subject to any disclaimer, the term of this patent is extended or adjusted under 35 U.S.C. 154(b) by 149 days.

(21) Appl. No.: 18/832,499

(22) PCT Filed: Sep. 22, 2023

(86) PCT No.: PCT/CN2023/120561
§ 371 (c)(1),
(2) Date: Jul. 23, 2024

(87) PCT Pub. No.: WO2025/025322
PCT Pub. Date: Feb. 6, 2025

(65) Prior Publication Data
US 2026/0108902 A1 Apr. 23, 2026

(30) Foreign Application Priority Data
Jul. 28, 2023 (CN) ......................... 202310949973.9

(51) Int. Cl.
*B05B 11/10* (2023.01)

(52) U.S. Cl.
CPC ...... *B05B 11/1077* (2023.01); *B05B 11/1059* (2023.01); *B05B 11/1067* (2023.01); *B05B 11/1073* (2023.01)

(58) Field of Classification Search
CPC ............. B05B 11/1077; B05B 11/1067; B05B 11/1059; B05B 11/1073; B05B 11/1066;
(Continued)

(56) References Cited

U.S. PATENT DOCUMENTS 5,096,094 A * 3/1992 Guilbert .............. B05B 11/1001 222/321.9
2023/0026887 A1 1/2023 Son et al.
(Continued)

FOREIGN PATENT DOCUMENTS

CN 103964056 A 8/2014
CN 212173101 U 12/2020
(Continued)

OTHER PUBLICATIONS

International Search Report and Written Opinion of PCT Application No. PCT/CN2023/120561, dated Dec. 11, 2023, 10 pgs with translation.

(Continued)

*Primary Examiner* — David J Walczak
(74) *Attorney, Agent, or Firm* — Buchalter; Jason W. Croft

(57) ABSTRACT

An all-plastic combined press pump includes a lock bottle, a pump body and a locking cap capable of fixing the pump body on the lock bottle. A liquid storage chamber, a communication port communicated with the liquid storage chamber, a one-way valve, and a pumping assembly slidable up and down are disposed in the pump body. A press head for driving the pumping assembly to move downwards is disposed at an upper end of the pumping assembly. A plastic spring for elastically pressing the press head to drive the pumping assembly to reset upwards to enable negative pressure in the liquid storage chamber to be generated so as to open the one-way valve to suck the liquid into the liquid storage chamber is disposed between the locking cap and the press head.

6 Claims, 5 Drawing Sheets

(58) Field of Classification Search
CPC ............... B05B 11/1039; B05B 11/104; B05B 11/1074
USPC ........................... 222/383.1, 383.3, 384, 385
See application file for complete search history.

(56) References Cited

U.S. PATENT DOCUMENTS

| | | | | |
|---|---|---|---|---|
| 2023/0201852 | A1 | 6/2023 | Goettke et al. | |
| 2023/0204085 | A1* | 6/2023 | Ki | F16F 1/3605 |
| 2024/0280117 | A1* | 8/2024 | Dai | B05B 11/106 |
| 2025/0161968 | A1* | 5/2025 | Burmann | B05B 11/1077 |

FOREIGN PATENT DOCUMENTS

| | | | |
|---|---|---|---|
| CN | 214987291 | U | 12/2021 |
| CN | 114148626 | A | 3/2022 |
| CN | 114803126 | A | 7/2022 |
| CN | 115489869 | A | 12/2022 |
| CN | 218318321 | U | 1/2023 |
| WO | 2017020787 | A1 | 2/2017 |
| WO | 2023027383 | A1 | 3/2023 |

OTHER PUBLICATIONS

Extended European Search Report for European Patent Application No. 23916600.2 mailed Jul. 21, 2025, 47 pages.

* cited by examiner

ALL-PLASTIC COMBINED PRESS PUMP

CROSS-REFERENCE TO RELATED APPLICATIONS

This application is a national stage filing under 35 U.S.C. § 371 of international application number PCT/CN2023/120561, filed Sep. 22, 2023, which claims priority to Chinese patent application No. 202310949973.9 filed Jul. 28, 2023. The contents of these applications are incorporated herein by reference in their entirety.

TECHNICAL FIELD

The present disclosure relates to an all-plastic combined press pump.

BACKGROUND

Liquid products such as shower gel and shampoo are indispensable parts in people's daily life. These liquid products are usually contained in a special bottle, and are squeezed out from the mouth of the pump head by pressing the press pump on the upper end of the bottle for using. The press pump generally consists of a press head, a locking cap, a metal spring, a screw cap, a body, a main column, a piston, an auxiliary column, a one-way valve, and a suction tube. Such press pump enables the press head to reset by using the metal spring. The remaining components are plastic parts. Before recycling and remolding the press pump, the metal spring needs to be manually taken out, which is time-consuming and laborious and has low production efficiency. Moreover, the metal spring will be in direct contact with the emulsion in the pump chamber. After the metal spring rusts, it will contaminate the liquid and is thus not conducive to long-term use of the product.

Therefore, the present disclosure is proposed based on the above deficiencies.

SUMMARY

An objective of the present disclosure is to overcome the deficiencies in the existing technology and provide an all-plastic combined press pump which has the characteristics of being simple in structure and conducive to recycling.

The present disclosure is realized through the following technical solutions.

An all-plastic combined press pump includes a lock bottle cap 1 capable of being fixed on a liquid containing bottle; a pump body 2 and a locking cap 3 capable of fixing the pump body 2 on the lock bottle cap 1 are disposed on the lock bottle cap 1; a liquid storage chamber 21, a communication port 22 communicated with the liquid storage chamber 21, a one-way valve 4 capable of controlling the communication port 22 to be opened to enable a liquid to enter the liquid storage chamber 21, and a pumping assembly 5 capable of sliding up and down are provided in the pump body 2; a press head 6 for driving the pumping assembly 5 to move downwards to enable air pressure to be generated in the liquid storage chamber 21 to extrude the liquid in the liquid storage chamber 21 to flow out is disposed at an upper end of the pumping assembly 5; a plastic spring 7 for elastically pressing the press head 6 to drive the pumping assembly 5 to reset upwards to enable negative pressure in the liquid storage chamber 21 to be generated so as to open the one-way valve 4 to suck the liquid into the liquid storage chamber 21 is disposed between the locking cap 3 and the press head 6; and the plastic spring 7 includes a first supporting part 71 abutting against the locking cap 3, a second supporting part 72 arranged above the first supporting part 71 and abutting against the press head 6, and elastic connecting parts 73 arranged between the first supporting part 71 and the second supporting part 72 and sequentially connected end to end to form a continuous Z-shaped structure.

According to the all-plastic combined press pump as described above, an included angle α between two adjacent elastic connecting parts 73 is 5° to 90°.

According to the all-plastic combined press pump as described above, the first supporting part 71, the second supporting part 72, and the elastic connecting parts 73 are in annular shapes.

According to the all-plastic combined press pump as described above, the first supporting part 71, the second supporting part 72, and the elastic connecting parts 73 are of circular ring sheet-like structures.

According to the all-plastic combined press pump as described above, the pumping assembly 5 includes a pump rod 51 with an upper end extending through the locking cap 3 to be inserted into the press head 6 and a lower end extending into the liquid storage chamber 21, and a piston 52 mounted on the pump rod 51 and capable of moving relative to the pump rod 51 and then driven by the pump rod 51; a liquid outlet channel 511 communicated with a liquid outlet end of the press head 6 is disposed in the pump rod 51; a liquid inlet 512 sealed by the piston 52 is disposed at the lower end of the pump rod 51; and the pump rod 51 is configured to move downwards relative to the piston 52 to open the liquid inlet 512 and enable an emulsion in the liquid storage chamber 21 to enter the liquid outlet channel 511.

According to the all-plastic combined press pump as described above, a lower end of the locking cap 3 is provided with an extension part 31 extending into the pump body 2 for abutting against and positioning the piston 52 as the piston 52 moves upwards; an inserted tube 61 extending downwards to be inserted into the extension part 31 is disposed on the press head 6; and the extension part 31 and the inserted tube 61 surround to form a spring cavity 8 containing the plastic spring 7.

According to the all-plastic combined press pump as described above, a longitudinally extending guide runner 311 is disposed on an inner wall of the extension part 31, and a guide sliding block 611 inserted into the guide runner 311 and sliding up and down along the guide runner 311 is disposed on an outer wall of the inserted tube 61.

The present disclosure has the following advantages over the existing technology.

1. In the present disclosure, the metal spring is replaced by the plastic spring with good resilience performance, and the remaining members are made of plastics. When recycling, the press pump can be recycled and remolded by simply removing the spring without disassembly, which has a high production efficiency and is energy-saving and environment-friendly.
2. The plastic spring is integrally formed by the first supporting part, the second supporting part, and the elastic connecting parts. It has a simple structure and is easy to mold and manufacture. In addition, the pressing within the included angle α between two adjacent elastic connecting parts in the range of 5° to 90° can also ensure better resilience performance.

DETAILED DESCRIPTION

Figure 1:
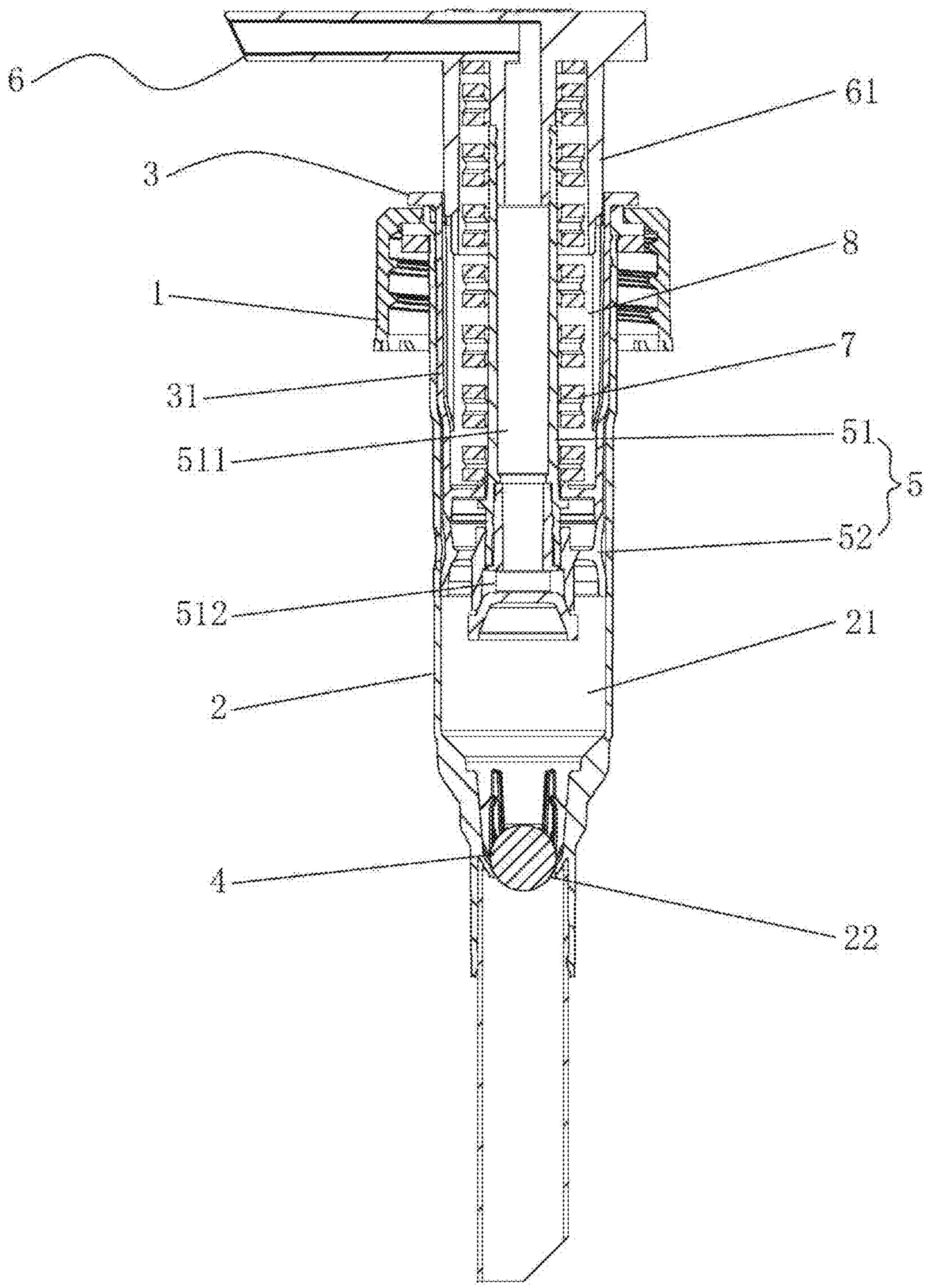
FIG. 1 is a schematic structural cross-section view of the present disclosure in its natural state.
Figure 2:
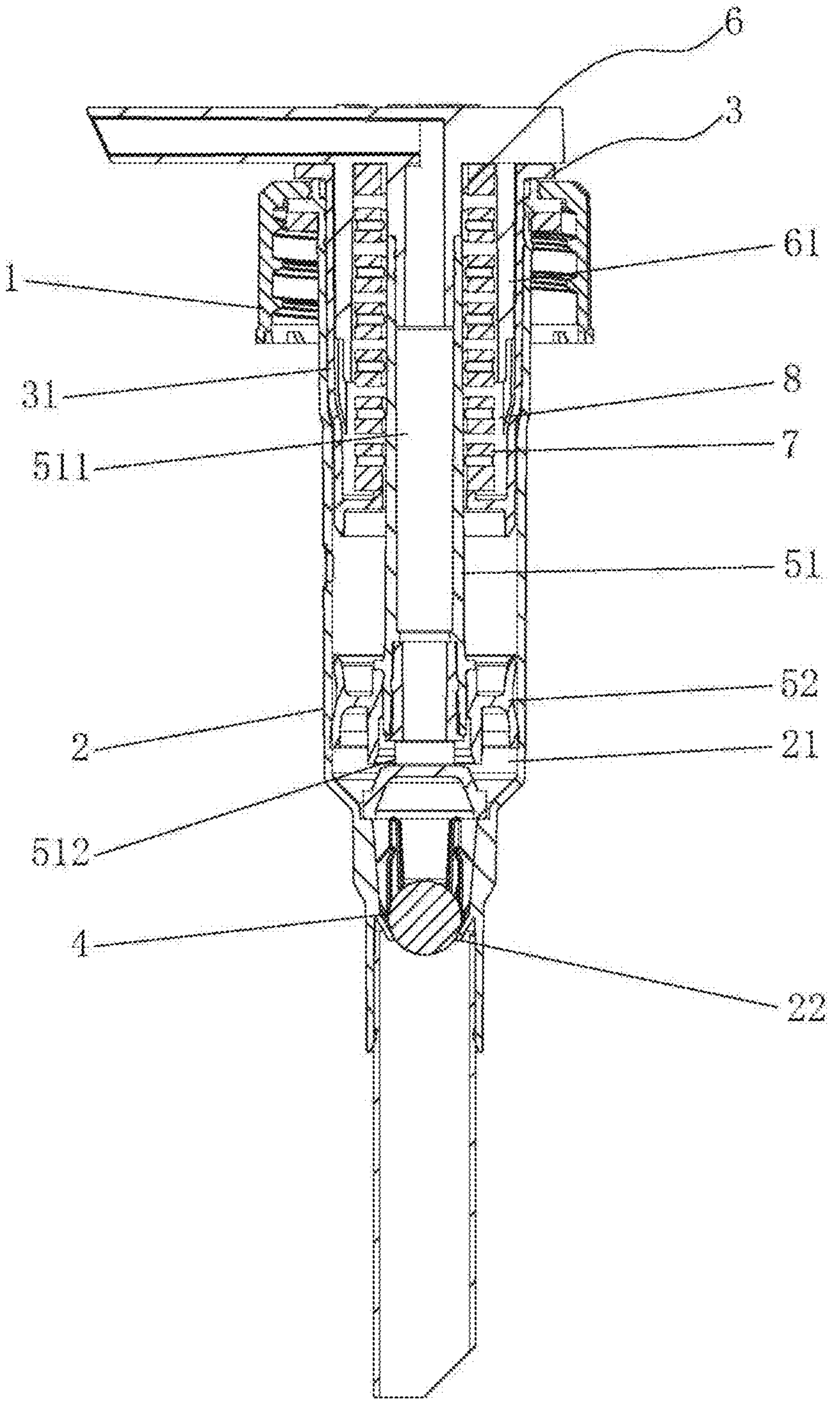
FIG. 2 is a schematic structural cross-section view of the present disclosure when a press head is pressed.

The present disclosure will be further described below in combination with the accompanying drawings:

As shown in FIGS. 1 to 5, an all-plastic combined press pump includes a lock bottle cap 1 capable of being fixed on a liquid containing bottle. A pump body 2 and a locking cap 3 capable of fixing the pump body 2 on the lock bottle cap 1 are disposed on the lock bottle cap 1. A liquid storage chamber 21, a communication port 22 communicated with the liquid storage chamber 21, a one-way valve 4 capable of controlling the communication port 22 to be opened to enable a liquid to enter the liquid storage chamber 21, and a pumping assembly 5 capable of sliding up and down are disposed in the pump body 2. A press head 6 for driving the pumping assembly 5 to move downwards to enable air pressure to be generated in the liquid storage chamber 21 to extrude the liquid in the liquid storage chamber 21 to flow out is disposed at an upper end of the pumping assembly 5. A plastic spring 7 for elastically pressing the press head 6 to drive the pumping assembly 5 to reset upwards to enable negative pressure in the liquid storage chamber 21 to be generated so as to open the one-way valve 4 to suck the liquid into the liquid storage chamber 21 is disposed between the locking cap 3 and the press head 6. The plastic spring 7 includes a first supporting part 71 abutting against the locking cap 3, a second supporting part 72 arranged above the first supporting part 71 and abutting against the press head 6, and one or more elastic connecting parts 73 arranged between the first supporting part 71 and the second supporting part 72 and sequentially connected end to end to form a continuous Z-shaped structure. Specifically, each Z-shaped structure is composed of three elastic connecting parts 73. The elasticity of the plastic spring is increased through the Z-shaped structure, and the plastic spring is integrally formed by the first supporting part, the second supporting part and the one or more elastic connecting parts. It has a simple structure and is easy to mold and manufacture. In the present disclosure, the metal spring is replaced by the plastic spring with good resilience performance, and the remaining members are made of plastics. When recycling, the press pump can be recycled and remolded by simply removing the spring without disassembly, which has a high production efficiency and is energy-saving and environment-friendly.

An included angle $\alpha$ between two adjacent elastic connecting parts 73 is 5° to 90°. The pressing within the range of 5° to 90° can also ensure good resilience performance, and also make the effective travel of the plastic spring longer and the range wider. Springs with different elasticities may also be produced according to needs and used in different press pumps.

Figure 3:
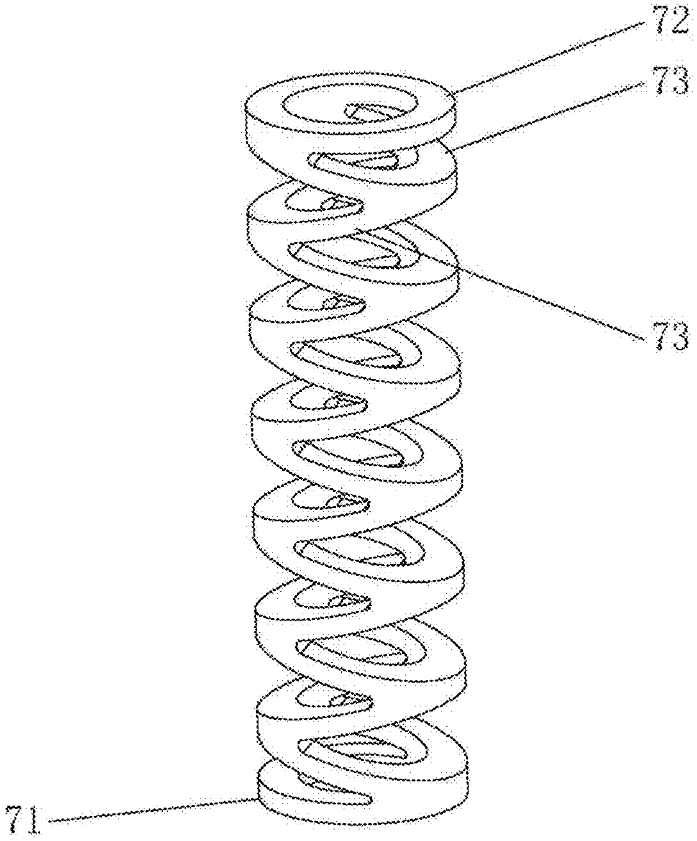
FIG. 3 is a perspective view of a spring of the present disclosure.
Figure 4:
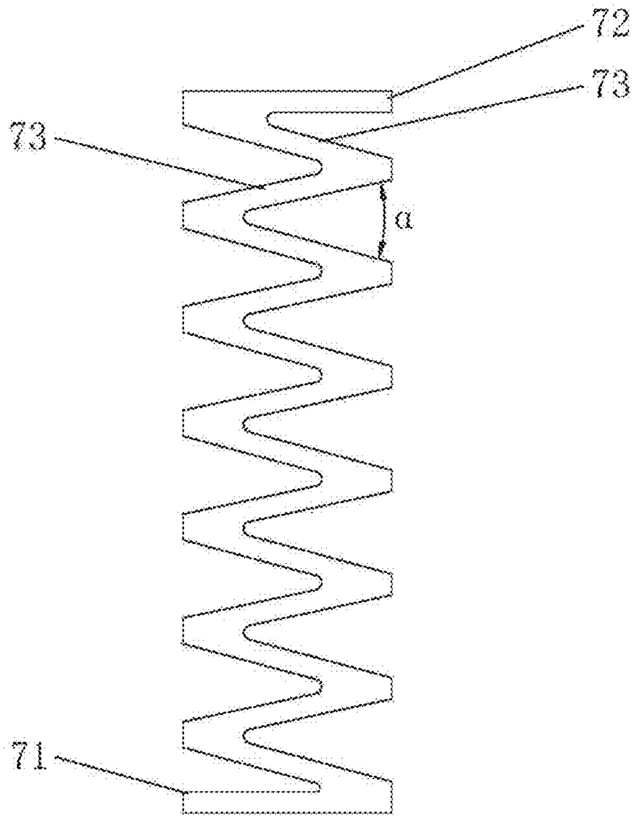
FIG. 4 is a front view of the spring of the present disclosure.
Figure 5:
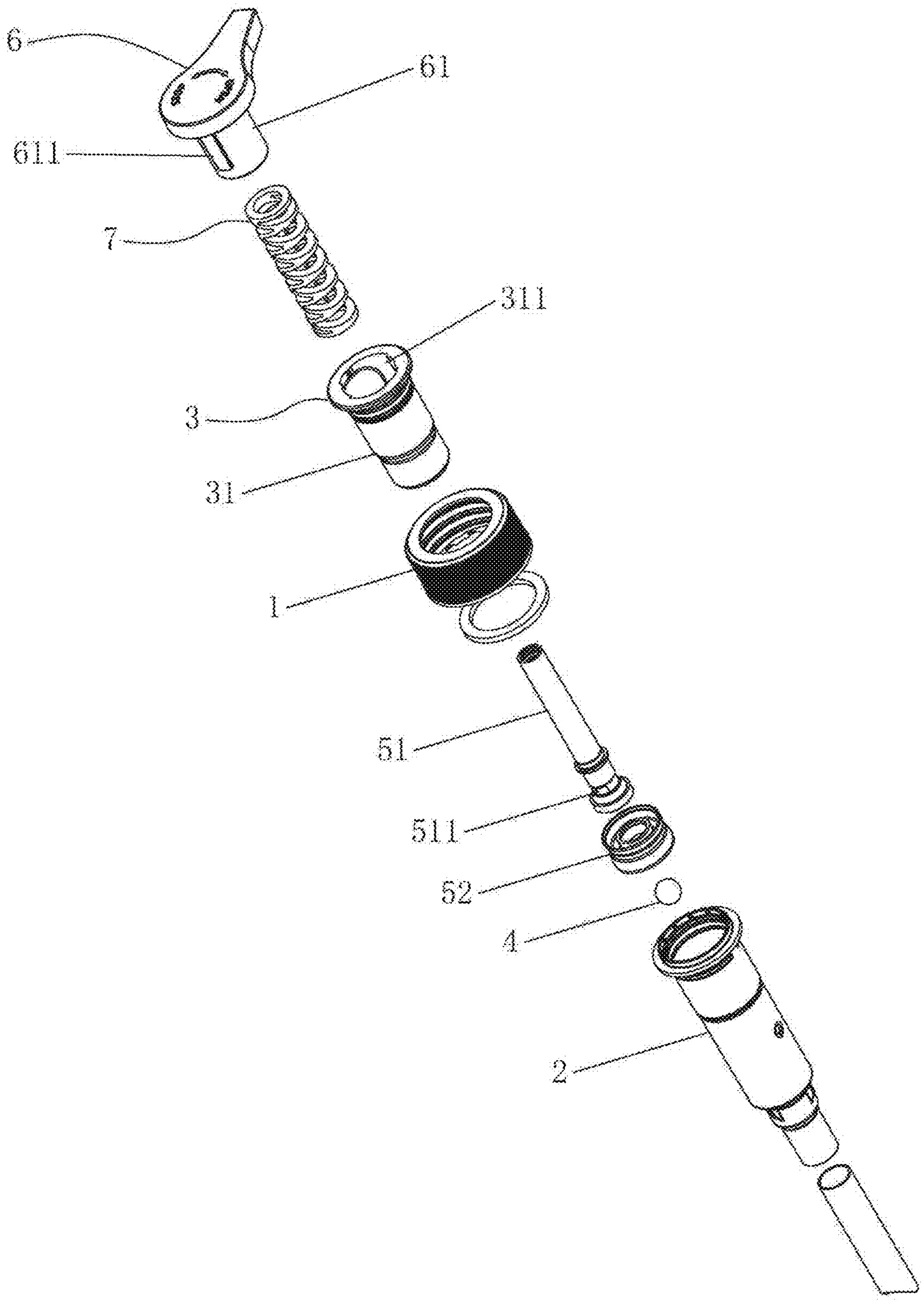
FIG. 5 is an exploded view of the present disclosure.

As shown in FIG. 3, the first supporting part 71, the second supporting part 72, and the elastic connecting parts 73 are in annular shapes. Specifically, the first supporting part 71, the second supporting part 72, and the elastic connecting parts 73 are of circular ring sheet-like structures. The circular ring sheet-like structures corresponding to the first supporting part 71 and the second supporting part 72 are parallel to each other. The circular ring sheet-like structures corresponding to the elastic connecting part 73 are inclined from top to bottom, and two adjacent elastic connecting parts 73 are inclined in opposite directions. With the above structures, the elastic connecting parts 73 have good deformation stability and maintain good elastic force in the axial direction.

In the present disclosure, the pumping assembly 5 includes a pump rod 51 with an upper end extending through the locking cap 3 to be inserted into the press head 6 and a lower end extending into the liquid storage chamber 21, and a piston 52 mounted on the pump rod 51 and capable of moving relative to the pump rod 51 and then driven by the pump rod 51. A liquid outlet channel 511 communicated with a liquid outlet end of the press head 6 is disposed in the pump rod 51. A liquid inlet 512 sealed by the piston 52 is disposed at a lower end of the pump rod 51. The pump rod 51 moves downwards relative to the piston 52 to open the liquid inlet 512 and enable emulsion in the liquid storage chamber 21 to enter the liquid outlet channel 511. When the press head at the top is pressed, the press head drives the pump rod to enable the pump rod to move downwards relative to the piston, and then the liquid inlet is opened. Then, the press head is pressed continuously to enable the pump rod to drive the piston to move downwards to generate air pressure. The liquid in the liquid storage chamber is sent to the liquid outlet end of the press head through the liquid inlet and the liquid outlet channel. When the press head is pressed and the liquid is pumped out, the plastic spring elastically presses the press head to drive the pump rod and the piston to move upwards and reset. The negative pressure is generated in the liquid storage chamber to suck in the liquid from the product bottle for next using.

Specifically, a lower end of the locking cap 3 is provided with an extension part 31 extending into the pump body 2 for abutting against and positioning the piston 52 as the piston 52 moves upwards. An inserted tube 61 extending downwards to be inserted into the extension part 31 is disposed on the press head 6. The extension part 31 and the inserted tube 61 surround to form a spring cavity 8 containing the plastic spring 7, to hide the plastic spring 7.

Further, a longitudinally extending guide runner 311 is disposed on an inner wall of the extension part 31, and a guide sliding block 611 inserted into the guide runner 311 and sliding up and down along the guide runner 311 is disposed on an outer wall of the inserted tube 61. When the guide sliding block 611 and the guide runner 311 are aligned, the press head 6 may slide up and down relative to the locking cap 3 when the press head 6 is pressed. The guide runner 311 and the guide sliding block 611 serves to guide the sliding of the press head 6, making the pressing stable. However, when the press head 6 is rotated to cause the guide sliding block 611 to be not aligned with the guide runner 311, the guide sliding block 611 may abut against the edge step of the locking cap 3 when the press head 6 is pressed, and cannot continue to move downwards. This can achieve self-locking of the press head 6.

What is claimed is:

1. An all-plastic combined press pump, comprising:

a lock bottle cap capable of being fixed on a liquid containing bottle;

a pump body and a locking cap capable of fixing the pump body on the lock bottle cap are disposed on the lock bottle cap;

a liquid storage chamber, a communication port communicated with the liquid storage chamber, a one-way valve capable of controlling the communication port to be opened to enable a liquid to enter the liquid storage chamber, and a pumping assembly capable of sliding up and down are disposed in the pump body;

a press head is disposed at an upper end of the pumping assembly, which is configured for driving the pumping assembly to move downwards to enable air pressure to be generated in the liquid storage chamber to extrude the liquid in the liquid storage chamber to flow out; and a plastic spring is disposed between the locking cap and the press head, which is configured for elastically pressing the press head to drive the pumping assembly to reset upwards to enable negative pressure in the liquid storage chamber to be generated so as to open the one-way valve to suck the liquid into the liquid storage chamber, wherein the plastic spring comprises a first supporting part abutting against the locking cap, a second supporting part arranged above the first supporting part and abutting against the press head, and a plurality of elastic connecting parts arranged between the first supporting part and the second supporting part and sequentially connected end to end to form a continuous Z-shaped structure, wherein the pumping assembly comprises a pump rod with an upper end extending through the locking cap to be inserted into the press head and a lower end extending into the liquid storage chamber, and a piston mounted on the pump rod and capable of moving relative to the pump rod and then driven by the pump rod; and wherein a lower end of the locking cap is provided with an extension part extending into the pump body for abutting against and positioning the piston as the piston moves upwards; an inserted tube extending downwards to be inserted into the extension part is disposed on the press head; and the extension part and the inserted tube surround to form a spring cavity containing the plastic spring.

2. The all-plastic combined press pump according to claim 1, wherein an included angle $\alpha$ between two adjacent elastic connecting parts is 5° to 90°.

3. The all-plastic combined press pump according to claim 1, wherein the first supporting part, the second supporting part, and the elastic connecting parts are in annular shapes.

4. The all-plastic combined press pump according to claim 3, wherein the first supporting part, the second supporting part, and the elastic connecting parts are of circular ring sheet-like structures.

5. The all-plastic combined press pump according to claim 1, wherein a liquid outlet channel communicated with a liquid outlet end of the press head is provided in the pump rod; a liquid inlet sealed by the piston is disposed at the lower end of the pump rod; and the pump rod is configured to move downwards relative to the piston to open the liquid inlet and enable emulsion in the liquid storage chamber to enter the liquid outlet channel.

6. The all-plastic combined press pump according to claim 1, wherein a longitudinally extending guide runner is disposed on an inner wall of the extension part, and a guide sliding block inserted into the guide runner and sliding up and down along the guide runner is disposed on an outer wall of the inserted tube.

* * * * *